US006678633B2

(12) United States Patent
Hessmert et al.

(10) Patent No.: US 6,678,633 B2
(45) Date of Patent: Jan. 13, 2004

(54) SYSTEM AND METHOD FOR DETERMINING THE HEIGHT OF THE CENTER OF GRAVITY OF A VEHICLE

(75) Inventors: Ulrich Hessmert, Schwieberdingen (DE); Jost Brachert, Ditzingen (DE); Thomas Sauter, Remseck (DE); Helmut Wandel, Markgroeningen (DE); Norbert Polzin, Zaberfeld (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/015,919

(22) Filed: Oct. 26, 2001

(65) Prior Publication Data

US 2002/0165690 A1 Nov. 7, 2002

(30) Foreign Application Priority Data

Oct. 28, 2000 (DE) .......................................... 100 53 605

(51) Int. Cl.$^7$ .......................... G01B 21/00; G06F 15/00
(52) U.S. Cl. ...................... 702/169; 702/141; 702/166; 701/83; 701/124
(58) Field of Search ................................ 702/127, 141, 702/145, 147, 166, 169; 701/1, 41, 70, 72, 83, 124; 180/180, 197, 219

(56) References Cited

U.S. PATENT DOCUMENTS

| | | | | |
|---|---|---|---|---|
| 6,253,123 B1 | * | 6/2001 | Schramm et al. | 701/1 |
| 6,366,844 B1 | * | 4/2002 | Woywod et al. | 701/83 |
| 6,424,907 B1 | * | 7/2002 | Rieth et al. | 701/124 |
| 6,494,281 B1 | * | 12/2002 | Faye et al. | 180/197 |

* cited by examiner

*Primary Examiner*—Bryan Bui
(74) *Attorney, Agent, or Firm*—Kenyon & Kenyon

(57) ABSTRACT

A system for determining the height of the center of gravity of a vehicle includes an arrangement configured to determine a difference between wheel contact forces, an arrangement configured to determine a transverse acceleration, an arrangement configured to determine comparison values which compares the change in the difference between wheel contact forces with the change in the transverse acceleration, and an arrangement configured to evaluate a roll model which determines the height of the center of gravity from the comparison values. Furthermore, a corresponding method is for determining the height of the center of gravity of a vehicle.

15 Claims, 1 Drawing Sheet

SYSTEM AND METHOD FOR DETERMINING THE HEIGHT OF THE CENTER OF GRAVITY OF A VEHICLE

FIELD OF THE INVENTION

The present invention relates to a system for determining the height of the center of gravity of a vehicle having an arrangement configured to determine the difference between wheel contact forces and an arrangement configured to determine a transverse acceleration. Furthermore, the present invention relates to a method for determining the height of the center of gravity of a vehicle, which includes the steps of determining a difference between wheel contact forces and determining a transverse acceleration.

BACKGROUND INFORMATION

In extreme circumstances, vehicles, in particular motor vehicles, can roll over. In particular, this is true if the center of gravity of the vehicle is relatively high. In such instances, taking a curve at an excessive speed may be enough to cause the vehicle to roll over. However, even in the case of vehicles having a center of gravity so low that they do not roll over during smooth travel along a single curve, when performing dynamic maneuvers, such as taking switchback curves, a build-up process may result in a roll-over. In all cases, the higher the vehicle's center of gravity, the greater the tendency to roll over, it being important that the center of gravity may shift significantly due to the loading of the vehicle, e.g., if additional loads are placed on the roof. The position of a vehicle's center of gravity may be measured, and, based on the results of these measurements, the vehicle dynamics control system should be subjected to influence, ultimately in order to prevent rolling over. Moreover, a system of this kind, which is based on measuring the lateral forces involved in the taking of a curve in a defined manner, among other things does not keep the vehicle from rolling over in the case of dynamic maneuvers such as taking switchback curves.

SUMMARY

The present invention relates to a system that includes an arrangement configured to determine comparison values which compare the change in the difference between wheel contact forces with the change in the transverse acceleration and an arrangement configured to evaluate a roll model which determines the height of the center of gravity using the comparison values. In this manner, it is possible to influence driving behavior not only in the case of static driving behavior, such as that which arises when a vehicle takes a curve in a defined manner, but also to influence driving behavior under extreme conditions, such as that which arises in switchback curves. A roll model, which modulates or models the vehicle's roll motion, may determine the height of the center of gravity from a comparison of the change in the wheel contact force difference with the change in the transverse acceleration. Thus, it is possible to determine whether countermeasures to prevent an imminent roll-over may be taken.

The device configured to determine the difference between wheel contact forces may measure wheel contact forces on the left side of the vehicle and on the right side of the vehicle using sensors and may calculate a difference between the wheel contact forces that are measured. This arrangement may be particularly useful, as in many vehicles sensors for measuring wheel contact forces are present, e.g., in vehicles equipped with ABS systems (anti-lock brake systems) or TCS systems (traction control systems).

However, it may also be useful that the arrangement configured to determine the difference between wheel contact forces includes sensors configured to perform direct measurement. Sensors of this type may be arranged, for example, on the motor vehicle's stabilizer. As the difference is measured directly, there is no need to calculate the difference using absolute values.

The arrangement configured to determine transverse acceleration may include an arrangement configured to measure the transverse acceleration. These yield reliable values so that the height of the center of gravity may be determined precisely.

However, it may also be useful for the arrangement configured to determine a transverse acceleration to include an arrangement configured to estimate the transverse acceleration. By using estimate algorithms, the expenditure associated with measuring components on the vehicle may be reduced, and thus also the number of vehicle components may be reduced. As estimate algorithms are used in TCS systems (traction control systems), using them constitutes a sensible measure.

It may be especially useful for the arrangement configured to evaluate a roll model to be configured to determine a moment of inertia about a critical axis, it being possible to determine the height of the center of gravity from the moment of inertia. As the moment of inertia is a characteristic value in conjunction with the rotation movement that is present in the case of a roll-over, it may be particularly suitable for performing follow-up determination of the height of the center of gravity.

An arrangement configured to modify a transverse acceleration threshold based on the height of the center of gravity may be provided. Thus, the transverse acceleration threshold above which engine output is reduced or the vehicle is braked may be reduced if the height of the center of gravity is increasing.

The present invention also relates to a method in which comparison values are determined, the change in the difference between wheel contact forces being compared with the change in the transverse acceleration, and in which with the help of a roll model the height of the center of gravity may be determined from the comparison values. In this manner, it is possible to influence driving behavior not only in the case of static driving behavior, which occurs, for example, when the vehicle takes a curve in a defined manner, but also under extreme conditions, which are, for example, present when the vehicle takes switchback curves. A roll model which modulates or models the roll movement may determine the height of the center of gravity from a comparison of the change in the wheel contact force difference with the change in the transverse acceleration. Thus, it is possible to determine whether countermeasures to prevent an imminent roll-over may be taken.

The difference between wheel contact forces may be determined, wheel contact forces on the left side of the vehicle and on the right side of the vehicle being measured by sensors, and the difference between the measured wheel contact forces may be determined. This arrangement may be particularly useful, as in many vehicles sensors for measuring wheel contact forces are present, e.g., in vehicles equipped with ABS systems (anti-lock brake systems) or TCS systems (traction control systems).

However, the difference between wheel contact forces may be determined via direct measurement using sensors.

Sensors of this type may be arranged, for example, on the motor vehicle's stabilizer. As the difference is measured directly, there is no need to calculate the difference using absolute values.

The transverse acceleration may be measured. This arrangement yields reliable values so that the height of the center of gravity may be determined precisely.

Moreover, the transverse acceleration may be estimated. By using estimate algorithms, the expenditure associated with measuring components on the vehicle may be reduced, and thus also the number of vehicle components may be reduced. As estimate algorithms are used in TCS systems (traction control systems), using them constitutes an especially sensible measure.

A moment of inertia about a critical axis may be determined, and the height of the center of gravity may be determined from the moment of inertia. As the moment of inertia is a characteristic value in conjunction with the rotation movement that is present in the case of a roll-over, it may be particularly suitable for performing a follow-up determination of the height of the center of gravity.

A transverse acceleration threshold may be modified based on the height of the center of gravity. Thus, the transverse acceleration threshold above which the engine output is reduced or the vehicle is braked may be reduced if the height of the center of gravity is increasing.

The present invention is based on the unanticipated discovery that rolling-over of the vehicle may be prevented even in the case of dynamic driving maneuvers, such as in switchback curves. This result is achieved by using a roll model, which provides a model of the vehicle's roll movement so that dynamic driving maneuvers that differ dramatically from the taking of a curve in a defined manner may also be subjected to control.

DETAILED DESCRIPTION

Figure 1:
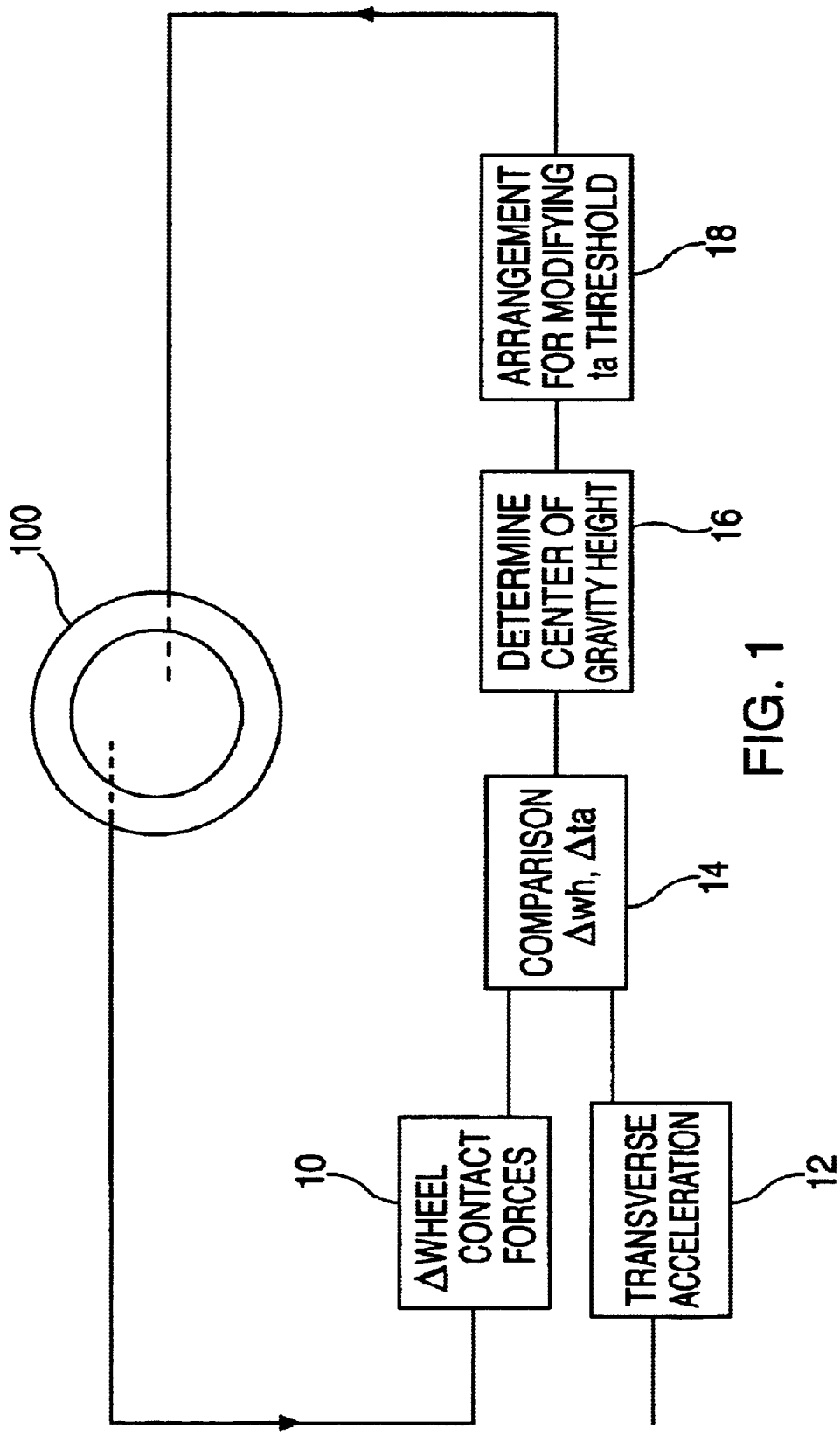
FIG. 1 is a schematic view of a system according to the present invention.

FIG. 1 is a schematic view of a system according to the present invention. Wheel 100 represents the wheels of a motor vehicle. A wheel contact force is measured at this wheel. Furthermore, wheel contact forces at the other wheels are measured. These measured values are input into an arrangement 10 configured to determine a difference between wheel contact forces, via which subsequently the difference between the wheel contact forces on the left side of the vehicle and on the right side of the vehicle is calculated. Furthermore, an arrangement 12 is configured to calculate a transverse acceleration, for example, measured values which are measured at a suitable point on the vehicle being sent to arrangement 12. The values for the difference between the wheel contact forces and the transverse accelerations that have been determined are sent to an arrangement 14 configured to determine comparison values, which compares, for example, the increase in the wheel contact forces difference with the increase in the transverse acceleration. In accordance with arrangement 16, the height of the center of gravity is determined from these comparison values in conjunction with a roll model. This height of the center of gravity is sent to an arrangement 18 configured to modify a transverse acceleration threshold. Arrangement 18 may, for example, if the height of the center of gravity is increasing, cause braking of the vehicle in the manner illustrated, or if the height of the center of gravity is increasing the engine output may be reduced.

The above description of the example embodiments according to the present invention is for illustrative purpose only and is not intended to limit the scope of the present invention. Various changes and modifications are possible within the scope of the present invention.

What is claimed is:

1. A system for determining a height of a center of gravity of a vehicle, comprising:
    an arrangement configured to determine a difference between wheel contact forces;
    an arrangement configured to determine a transverse acceleration;
    an arrangement configured to compare a change in the difference between wheel contact forces with a change in the transverse acceleration and to determine comparison values; and
    an arrangement configured to evaluate a roll model and to determine the height of the center of gravity in accordance with the comparison values.

2. The system according to claim 1, wherein the arrangement configured to determine the difference between wheel contact forces is configured to measure wheel contact forces on a left side of the vehicle and on a right side of the vehicle and to calculate the differences between the measured wheel contact forces.

3. The system according to claim 1, wherein the arrangement configured to determine the difference between wheel contact forces includes direct-measurement sensors.

4. The system according to claim 1, wherein the arrangement configured to determine the transverse acceleration includes an arrangement configured to measure the transverse acceleration.

5. The system according to claim 1, wherein the arrangement configured to determine the transverse acceleration includes an arrangement configured to estimate the transverse acceleration.

6. The system according to claim 1, wherein the arrangement configured to evaluate the roll model is configured to determine a moment of inertia about a critical axis, the height of the center of gravity being determinable in accordance with the moment of inertia.

7. The system according to claim 1, further comprising an arrangement configured to modify a transverse acceleration threshold in accordance with the height of the center of gravity.

8. A method for determining a height of a center of gravity of a vehicle, comprising the steps of:
    determining a difference between wheel contact forces;
    determining a transverse acceleration;
    determining comparison values in accordance with a comparison of a change in the difference between wheel contact forces with a change in the transverse acceleration; and
    determining the height of the center of gravity in accordance with the comparison values using a roll model.

9. The method according to claim 8, wherein the step of determining the difference between wheel contact forces includes the sub steps of measuring wheel contact forces on a left side of the vehicle and a right side of the vehicle by sensors and calculating the difference between the measured wheel contact forces.

10. The method according to claim 9, wherein the step of determining the difference between wheel contact forces includes the substep of directly measuring the difference between wheel contact forces using sensors.

11. The method according to claim 8, wherein the step of determining the transverse acceleration includes the substep of measuring the transverse acceleration.

12. The method according to claim 8, wherein the step of determining the transverse acceleration includes the substep of estimating the transverse acceleration.

13. The method according to claim 8, further comprising the steps of:

determining a moment of inertia about a critical axis; and determining the height of the center of gravity in accordance with the moment of inertia.

14. The method according to claim 8, further comprising the step of modifying a transverse acceleration threshold in accordance with the height of the center of gravity.

15. A method for determining a height of a center of gravity of a vehicle, comprising the steps of:

determining a difference between wheel contact forces;

determining a transverse acceleration;

calculating a change in the difference between wheel contact forces over time;

calculating a change in the transverse acceleration over time;

calculating a comparison difference between the change in the difference between wheel contact forces over time and the change in the transverse acceleration over time; and determining the height of the center of gravity in accordance with the comparison difference using a roll model.

\* \* \* \* \*